US010514052B2

(12) United States Patent
Ceccacci

(10) Patent No.: US 10,514,052 B2
(45) Date of Patent: Dec. 24, 2019

(54) SYSTEM FOR COUPLING TWO PREFABRICATED PANELS FOR CONSTRUCTION

(71) Applicant: OC S.R.L., Pontinia (IT)

(72) Inventor: Gerardo Ceccacci, Pontinia (IT)

(73) Assignee: OC S.R.L., Pontinia (IT)

( * ) Notice: Subject to any disclaimer, the term of this patent is extended or adjusted under 35 U.S.C. 154(b) by 0 days.

(21) Appl. No.: 16/096,767

(22) PCT Filed: Apr. 13, 2017

(86) PCT No.: PCT/IT2017/000074
§ 371 (c)(1),
(2) Date: Oct. 26, 2018

(87) PCT Pub. No.: WO2017/187464
PCT Pub. Date: Nov. 2, 2017

(65) Prior Publication Data
US 2019/0120265 A1    Apr. 25, 2019

(30) Foreign Application Priority Data

Apr. 27, 2016 (IT) .................. 102016000042721

(51) Int. Cl.
*E04B 1/61* (2006.01)
*F16B 5/00* (2006.01)
*E04B 2/72* (2006.01)

(52) U.S. Cl.
CPC .......... *F16B 5/0052* (2013.01); *E04B 1/6158* (2013.01); *E04B 2/721* (2013.01); *F16B 5/0092* (2013.01)

(58) Field of Classification Search
CPC .... F16B 5/0052; F16B 5/0032; F16B 5/0092; F16B 21/02; E04B 1/6158
See application file for complete search history.

(56) References Cited

U.S. PATENT DOCUMENTS

| 4,359,294 A * | 11/1982 | Crillesen | ............... F16B 5/0052 |
| | | | 403/359.1 |
| 5,970,675 A * | 10/1999 | Schray | .................. E04B 1/6137 |
| | | | 160/135 |

(Continued)

FOREIGN PATENT DOCUMENTS

FR    1441756 A    6/1966

OTHER PUBLICATIONS

International Search Report and Written Opinion for PCT/IT2017/000074 dated Sep. 22, 2017.

*Primary Examiner* — Gisele D Ford
(74) *Attorney, Agent, or Firm* — Thomas Horstemeyer, LLP

(57) ABSTRACT

The present invention relates to an improved system for coupling prefabricated construction panels. The system comprises: —a first prefabricated panel (1) and a second prefabricated panel (2) having a first groove (1A) shaped with a dove-tail cross-section and a second groove (1A') shaped with a dove-tail cross-section, each groove (1A, 1A') being formed by a first oblique side (11,11') having a first end and a second end, a second oblique side (12,12') having a first end and a second end, and a third side (13, 13') connecting the first end of said first oblique side (11, 11') to the first end of said second oblique side (12, 12'), —at least one coupling element (2) for coupling said first prefabricated panel (1) to said second prefabricated panel (2), —a plate key (3), integral with said coupling element (2), configured to rotate said coupling element (2) from a rest position, wherein said prefabricated panels are not coupled by said coupling element, to a locking position, wherein said prefabricated panels are coupled together and locked in a fixed position between them by said coupling element, and vice versa. In particular, each oblique side (11, 12) of said first (Continued)

groove (1A) has respectively a first relief (11A) and a second relief (12A) arranged at the second end of a respective oblique side (11, 12) respectively, and protrudes in such a way as to form respectively a first step (111) and a second step (121) with the respective oblique side, wherein said first relief (111) faces said second relief (121). Each oblique side (11', 12') of said second groove (1A') has respectively a third relief (11A') and a fourth relief (12A') arranged at the second end of a respective oblique side (11', 12') of said second groove (1A') and protrudes to form a third step (111') and a fourth step (121') respectively with the respective oblique side, wherein said third relief (111) faces said fourth relief (121). Said coupling element (2) has a first end part (21), a second end part (22) and a central part (23) arranged between said first end part (21) and said second end part (22), where said first end part (21) protrudes with respect to said central portion (23) so as to form at least a first step (211) and wherein said second end part (22) protrudes with respect to said central portion (23) so as to form at least a second step (221).

5 Claims, 5 Drawing Sheets

(56) References Cited

U.S. PATENT DOCUMENTS

| | | | |
|---|---|---|---|
| 2002/0176766 A1* | 11/2002 | LeVey | F16B 5/0642 |
| | | | 411/553 |
| 2003/0059255 A1* | 3/2003 | Kirchen | F16B 21/02 |
| | | | 403/353 |
| 2007/0137124 A1* | 6/2007 | MacDermott | E04B 2/745 |
| | | | 52/278 |
| 2010/0290863 A1* | 11/2010 | Rogers | F16B 21/02 |
| | | | 411/340 |
| 2019/0009736 A1* | 1/2019 | Revilla Lopez | B60R 13/0206 |

* cited by examiner

SYSTEM FOR COUPLING TWO PREFABRICATED PANELS FOR CONSTRUCTION

CROSS-REFERENCE TO RELATED APPLICATION

This application is the 35 U.S.C. § 371 national stage application of PCT Application No. PCT/IT2017/000074, filed Apr. 13, 2017, where the PCT claims the priority to and benefit of Italian Patent Application No. 102016000042721, filed Apr. 27, 2016, both of which are herein incorporated by reference in their entireties.

The present invention relates to an improved system for coupling prefabricated construction panels.

Specifically, the invention relates to the structure of a system for coupling a first prefabricated panel to a second prefabricated panel so that they are parallel and that a first and/or second surface (opposite to said first surface) of said first prefabricated panel be coplanar respectively with a first surface and/or a second surface (opposite to said first surface) of said second prefabricated panel.

Indeed, each prefabricated panel comprises at least a first surface and a second surface, opposite to said first surface.

Said surfaces may be, for example, surfaces perpendicular to a support plane when the prefabricated panels are arranged vertically on said support plane.

In the construction industry, prefabricated panels are used for the construction of walls, such as dividing walls or movable walls, or for doors.

At present, a system for coupling prefabricated panels is known.

Said system comprises two prefabricated panels, a locking element for locking said two panels and a plate key to rotate said locking element and allow the two prefabricated panels to pass from a first position, wherein each of said panels is free to slide, to a second position, wherein said panels are locked in position by said locking element, and vice versa.

Said locking element has a longitudinal section substantially of an hourglass formed by a first frusta-pyramidal element and a second frusto-pyramidal element each having a first height and a second height respectively, wherein said second height is equal to said first height. Said plate (or lamina) key is integral with the locking element, and is disposed on an plane orthogonal to an axis passing through said first height and said second height.

For the plate key to be integral with the locking element, the plate key is secured to said locking element mechanically. A significant pressure is exerted on said plate key until it is steadily fixed to said locking element.

To facilitate the fixing of the plate key to the locking element, the latter is provided with two slits or recesses, disposed on the same plane at a central portion thereof, and said plate key is provided with a recess so that, when the plate key is secured to said locking element, each slit accommodates a plate key portion close to said recess.

However, the plate key may not be secured to the locking element in such a way that it is perfectly orthogonal.

Consequently, after coupling two prefabricated panels, it often happens that a prefabricated panel is inclined to the other, with the disadvantage that at least one first surface of a prefabricated panel does not lay on the same plane as the respective surface of the other prefabricated panel.

Moreover, since the plate key is made of metal material and said locking element is made of plastic material, the operation of making the key integral with said locking element involves the removal of material from the locking element itself.

Also the removal of material from the locking element may be due to a lack of coplanarity of the surfaces of the prefabricated panels when said prefabricated panels are coupled.

The object of the present invention is to overcome the above disadvantages by providing a system for coupling two prefabricated panels in such a way as to ensure a complanarity between two adjacent surfaces of said two prefabricated panels when said two prefabricated panels are coupled.

It is therefore subject-matter of the invention a coupling system for coupling two prefabricated building panels, said system comprising:

a first prefabricated panel and a second prefabricated panel having respectively a first groove shaped so as to have the cross-section of a dove-tail and a second groove shaped so as to have the cross-section of a dove-tail, each groove being formed by a first oblique side having a first end and a second end, a second oblique side having a first end and a second end, and a third side joining the first end of said first oblique side to the first end of said second oblique side, at least one coupling element for coupling said first prefabricated panel with said second prefabricated panel, wherein said coupling element has in a longitudinal section the shape of substantially an hourglass formed by a first frusto-pyramidal element having a first height and a second frusto-pyramid element having a second height equal to said first height, said coupling element having a first axis or reference axis passing through said first height and said second height, said pyramidal elements being symmetrical with respect to a plane perpendicular to said reference axis, said first frusto-pyramidal element and said second frusto-pyramidal element having respectively a first base and a second base, each base being configured so as to have a first length in a longitudinal direction and a second length in a transverse direction, wherein said first length is larger than said second length, a plate key, integral with said coupling element, and perpendicular or substantially perpendicular to said reference axis, configured to rotate said coupling element from a rest position, wherein each frusto-pyramid element is inserted in a respective groove with said first length substantially oriented along said respective groove so that each frusto-pyramidal element is not bound to the respective groove along said reference axis, to a locking position, wherein each frusto-pyramidal element is inserted into the respective groove with said second length substantially oriented along said respective groove so that each frusto-pyramidal element is constrained to the respective groove along said reference axis, and vice versa.

According to the invention, the first oblique side and the second oblique side of said first groove have respectively a first relief and a second relief, each of which is respectively located at the second end of a respective oblique side of said first groove and protrudes so as to form respectively a first step and a second step with the respective oblique side, wherein said first relief is faced with said second relief. In addition, the first oblique side and the second oblique side of said second groove have respectively a third relief and a fourth relief respectively, each of which is respectively located at the second end of a respective oblique side of said second groove and protrudes in such a way to form respectively a third step and a fourth step with the respective oblique side, where said third relief is faced with said fourth relief.

Said coupling element has, along said reference axis, a first end part, a second end part, and a central part between said first end part and said second end part, wherein said first end part protrudes with respect to said central part so as to form at least a first step and wherein said second end part protrudes with respect to said central part so as to form at least a second step.

When said two prefabricated panels are in said locking position, the first relief and second relief of said first groove of said first prefabricated panel abut to said at least one first step of said coupling element, and the third relief and the fourth relief of said second groove of said second prefabricated panel abut to said at least a second step of said coupling element.

It is preferable that said coupling element has two first recesses, opposed to one another and arranged in correspondence of at least said first end part, so that two first steps, opposite to one another, are formed with respect to said central part, and that said coupling element has two second recesses opposed to each other, arranged in correspondence of at least said second end part so that two second steps opposed to one another are formed with respect to the central part.

Said plate key has a first surface and a second surface, opposite said first surface, and preferably comprises a plurality of projections or bosses aligned along a first axis and arranged close to a first side of said plate key and a further plurality of projections, aligned along a second axis, parallel to said first axis, and arranged close to a second side, opposite said first side. Said plurality of projections comprises at least one first projection, arranged on said first surface, and at least one second projection, disposed on said second surface, and said plurality of projections comprise at least one further first projection, arranged on said first surface, and at least one further second projection, arranged on said second surface.

Said coupling element may be provided with a first pair of first protrusions arranged at opposite portions of said first end part and a second pair of second protrusions arranged at opposite portions of said second end part.

Said coupling element may be provided with two recesses opposed to each other to accommodate a respective portion of said plate key, disposed on the same plane perpendicularly to said reference axis, and provided with a third pair of third protrusions, disposed on the first frusto-pyramidal element at opposite portions of said central part such that it is at a predetermined distance from a second axis perpendicular to said reference axis and passing through said recesses, and a fourth pair of fourth protrusions arranged on the second frusto-pyramidal element at opposite portions of said central part such that it is at a second predetermined distance from said second axis, equal to said predetermined first distance.

The present invention will now be described, by way of illustration, but not by way of limitation, according to one embodiment, with particular reference to the accompanying drawings, wherein.

Figure 3A:
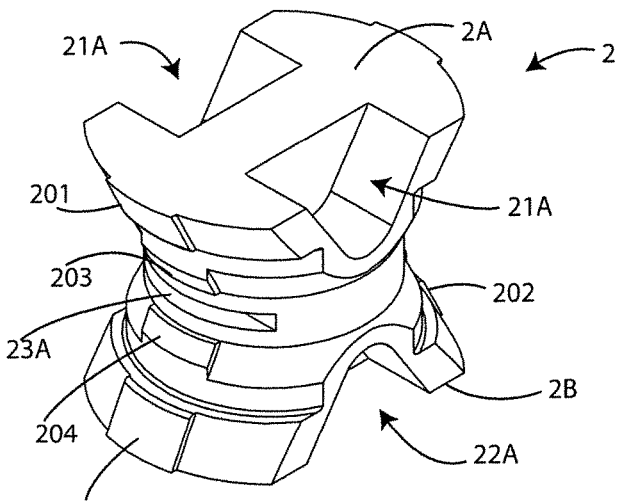
FIG. 3A shows a perspective view of the coupling element for coupling two prefabricated panels.
Figure 3B:
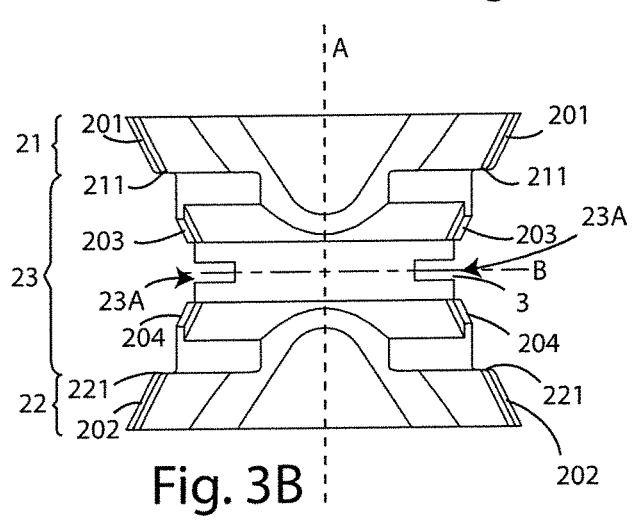
FIGS. 3B and 3C show respectively a front view and a side view of the coupling element of FIG. 3A.
Figure 3C:
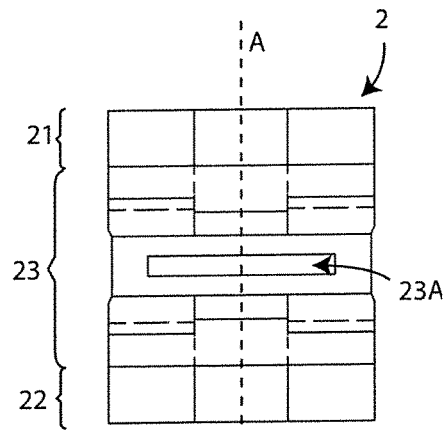
Figure 3D:
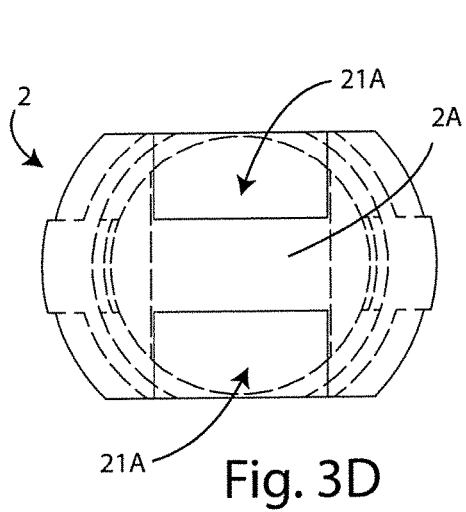
Figure 3E:
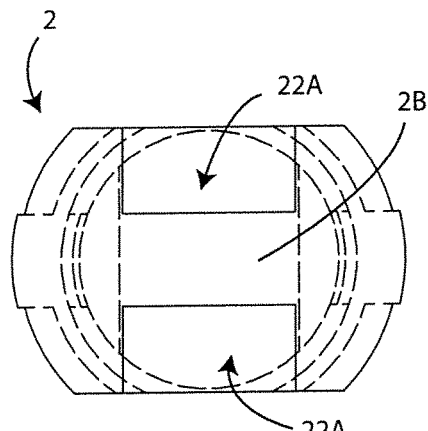
Figure 4:
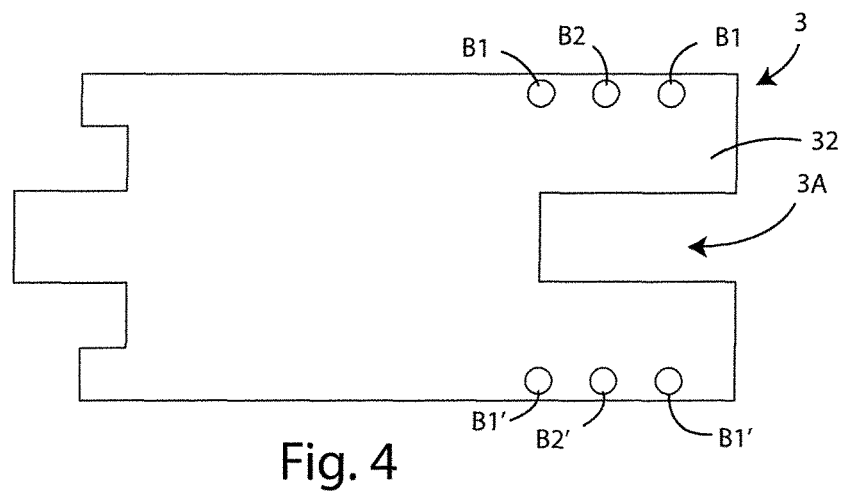
Figure 4B:
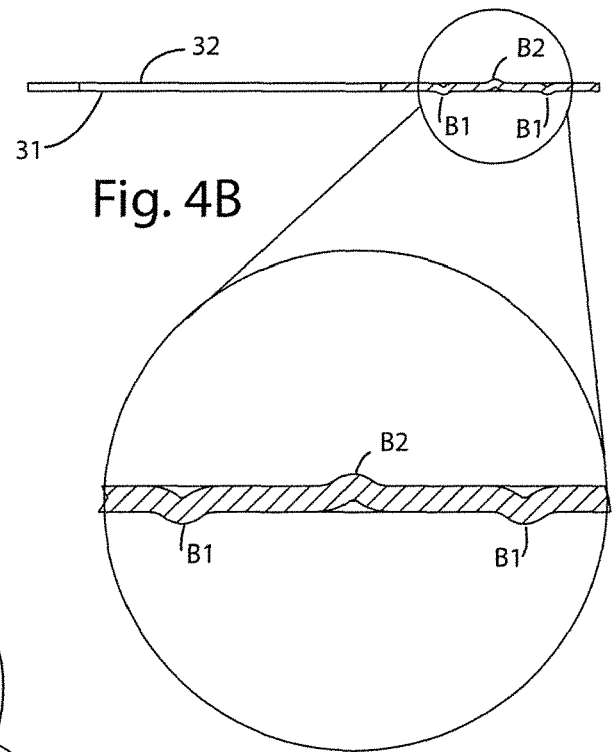
Figure 5:
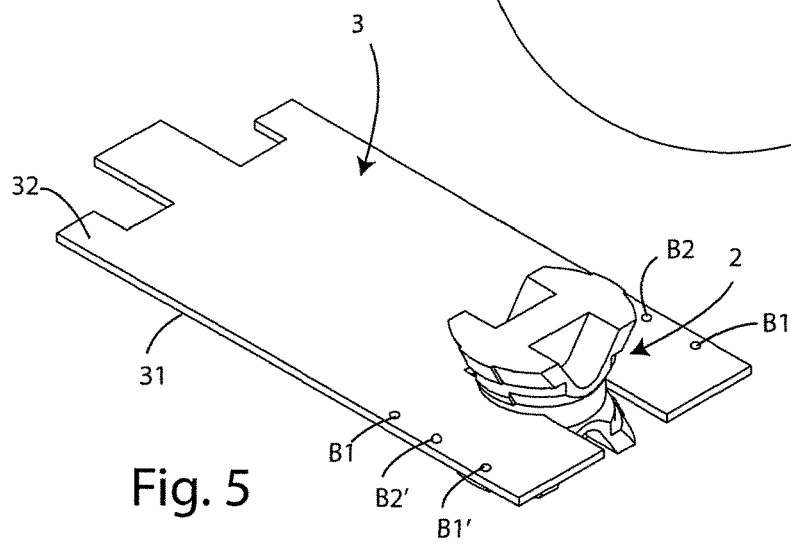
Figure 6A:
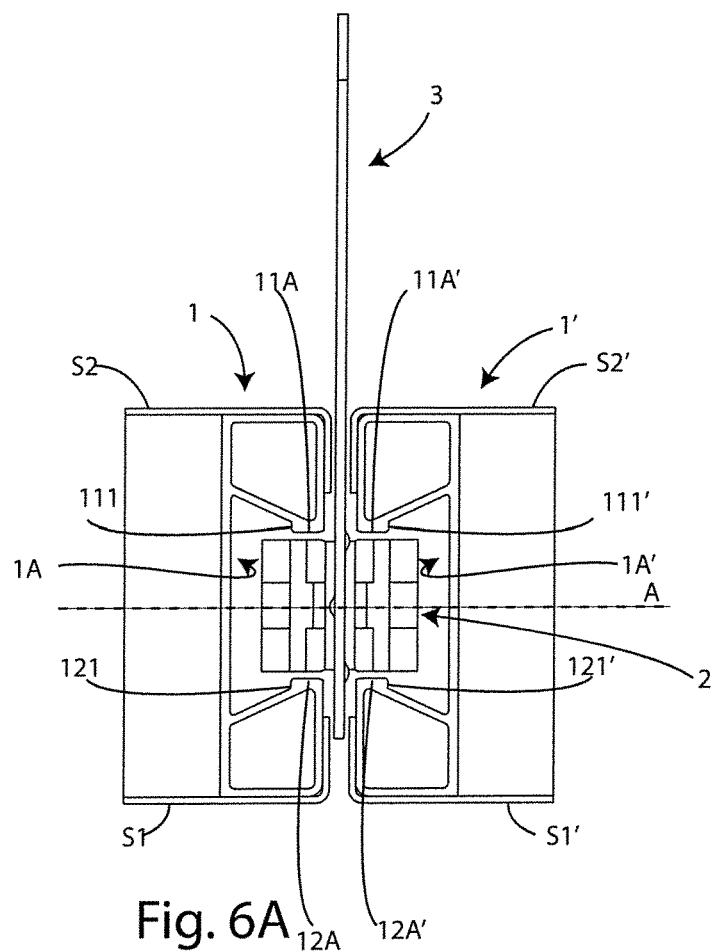
Figure 6B:
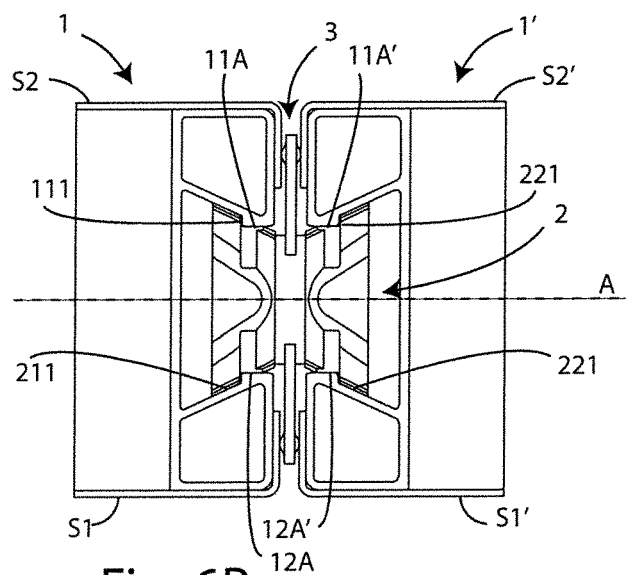
Figure 7:
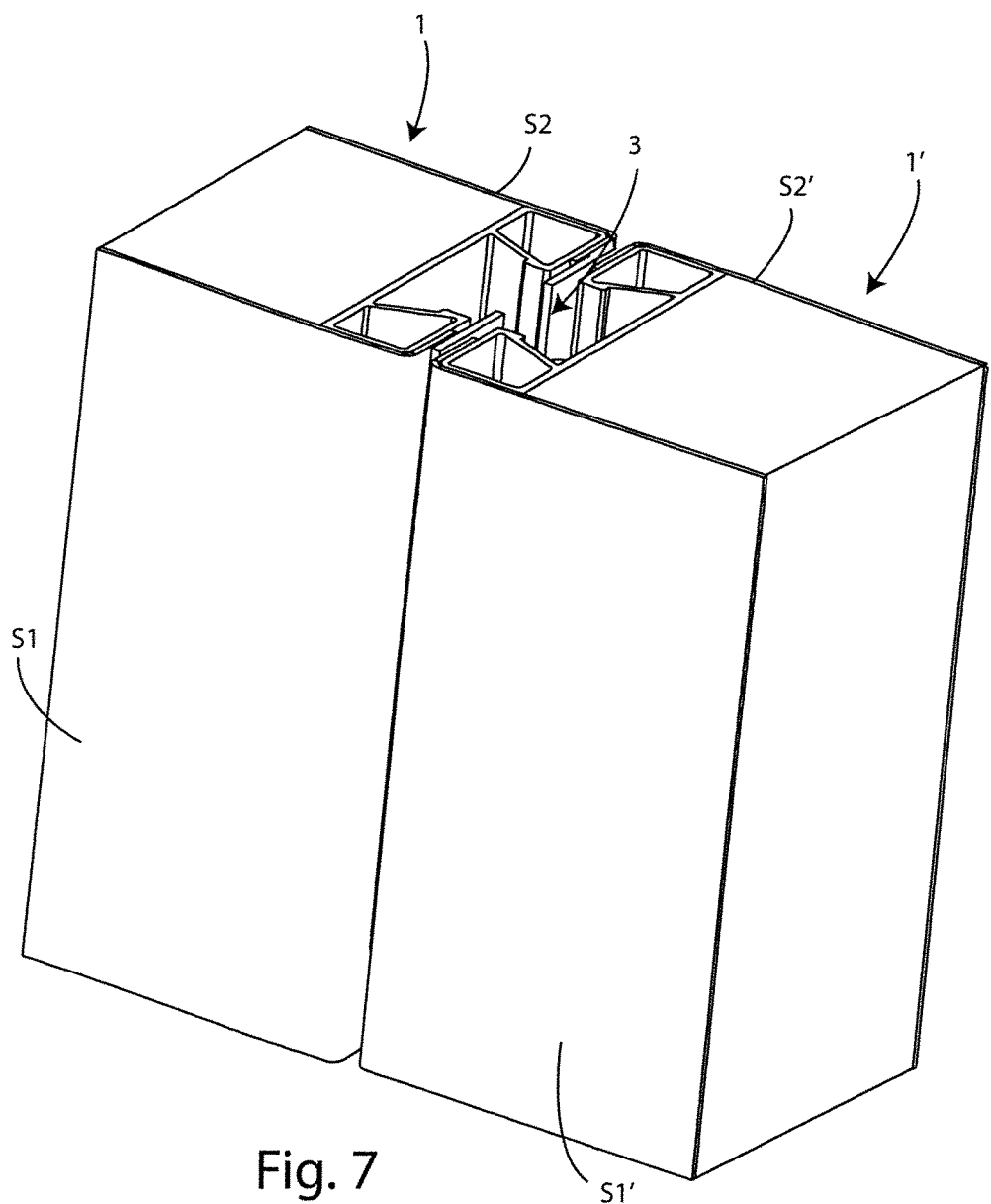

FIGS. 3D and 3E respectively show a top view and a bottom view of the coupling element of FIG. 3A;

FIG. 4A is a top view of the plate key;

FIG. 4B is a side view of the plate key;

FIG. 5 shows the plate key integral with the coupling element;

FIG. 6A is a cross-sectional view of the system of the invention in a rest position;

FIG. 6B is a cross-sectional view of the system of the invention in the working position;

FIG. 7 shows two prefabricated panels coupled to each other.

Figure 1:
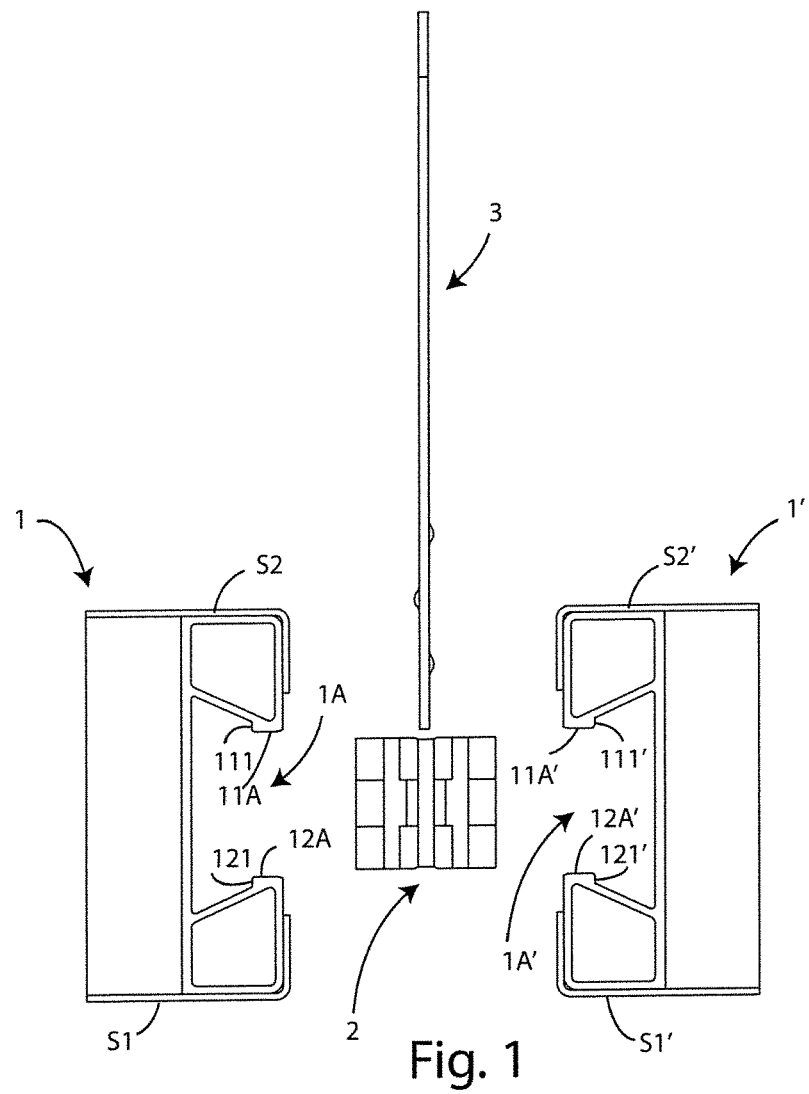
FIG. 1 is an exploded view of the system of the invention.

With particular reference to FIG. 1, a system for coupling two prefabricated building panels is described.

That system comprises:
a first prefabricated panel 1,
a second prefabricated panel 1',
at least one coupling element 2 for coupling said first prefabricated panel 1 with said second prefabricated panel 1'
at least one plate key 3, integral with said at least one coupling element 2.

Each prefabricated panel 1,1' comprises a first surface S1, S1' and a second surface S2, S2', opposite to said first surface.

In the embodiment of the invention, the system of the invention comprises a coupling element 2 and a plate key, integral with it.

However, although not shown in the figures, it may be that said system comprises a plurality of coupling elements 2 and consequently a plurality of plate keys 3, each of which is integral with a respective coupling element 2, according to the dimensions of the prefabricated panels.

Figures 2A, 2B:
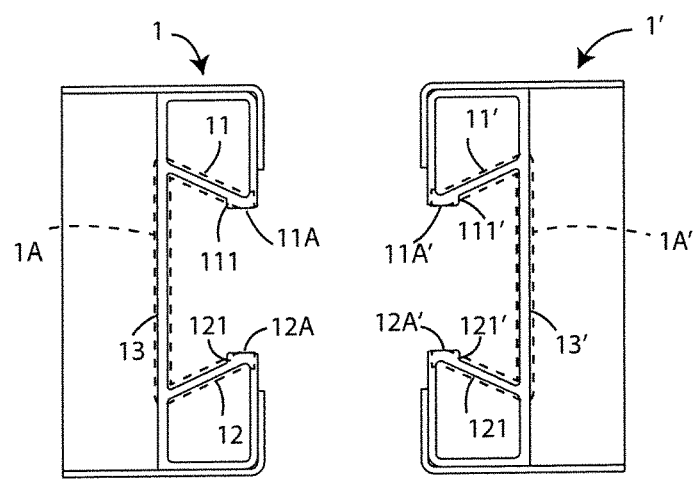
FIGS. 2A and 2B show the cross-section respectively of the first prefabricated panel and of the second prefabricated panel.

Referring to FIGS. 2A and 2B, said first prefabricated panel 1 and said second prefabricated panel 1' have a first groove 1A and a second groove 1A' respectively, each of which is shaped in a dove-tail cross-section.

Each groove 1A, 1A' is formed by a first oblique side 11,11' having a first end and a second end, a second oblique side 12,12' having a first end and a second end, and a third side 13, 13', which joins the first end of said first oblique side 11,11' and the first end of said second oblique side, 12,12'.

According to the invention, with reference to the first groove 1A, the first oblique side 11 has a first relief 11A disposed at the second end of said first oblique side and the second oblique side 12 has a second relief 12A arranged in correspondence of the second end of said second oblique side.

Said first relief 11A and said second relief 12A protrude so as to form respectively a first step 111 and a second step 121 with the respective oblique side.

In particular, said first relief 11A faces said second relief 12A.

With reference to the second groove 1A' of the second prefabricated panel, the first oblique side 11' has a third relief 11A' disposed at the second end of said first oblique side 11' and the second oblique side 12' has a fourth relief 12k, disposed at the second end of said second oblique side.

Said third relief 11A' and said fourth relief 12A' protrude so as to form respectively a third step 111' and a fourth step 121' with respective oblique side.

In particular, said third relief 11A' is faced with said fourth relief 12A'.

With reference to FIGS. 3A, 3B, 3C, 3D and 3E, said coupling element 2 is shown.

Said coupling element 2 has a longitudinal section substantially with the shape of an hourglass formed by a first frusto-pyramidal element and a second frusto-pyramidal element each having a first height and a second height equal to said first height.

Further, said coupling element 2 has a first axis or reference axis A passing through said first height and said second height.

Said first frusto-pyramidal element and said second frusto-pyramidal element have respectively a first base 2A and a second base 2B respectively, each of which is configured so as to have a first length in a longitudinal direction and a second length in a transverse direction wherein said first length is larger than said second length.

In particular, in the embodiment described herein, said first base and said second base have a shape substantially shaped as a H.

In particular, said coupling element 2 has, along said reference axis A, a first end part 21, a second end part 22 and a central part 23 between said first end part 21 and said second end part 22.

According to the invention, said first end part 21 protrudes with respect to said central part 23 so as to form one or more first steps 211 and said second end part 22 protrudes with respect to said central part 23 so as to form one or more second steps 221.

In the embodiment described herein, said first end part 21 has two first recesses 21A, opposed to each other, arranged so that two first steps 211, opposite each other, are formed with respect to the central part 23 and said second end part 22 has two second recesses 22A, opposed to one another, arranged so that two second steps 221, opposing each other, are formed with respect to the central part 23.

In particular, said first holes 21A are arranged at said at least one first end part 21 and said second holes 22A are arranged at said at least the second end part 22.

The central part 23 is provided with two recesses 23A opposed to each other to accommodate a respective portion of said plate key 3 disposed on the same plane perpendicular to said reference axis A.

In the described embodiment, said coupling element 2 is provided with a first pair of first protrusions 201, arranged at opposite portions of the first end part 21, and a second pair of second protrusions 202, arranged in correspondence of opposite portions of said second end part 22.

Moreover, said coupling element 2 is provided with a third pair of third protrusions 203 arranged on the first frusto-pyramidal element at opposite portions of the central part 23 so as to be at a predetermined distance from a second axis B perpendicular to said reference axis A and passing through said recesses 23A, and a fourth pair of protrusions 204 disposed on the second frusto-pyramidal element at opposite portions of said central part 23 so as to be at a second predetermined distance from said second axis B, equal to said predetermined first distance.

The above-mentioned protrusions 201,202,203,204 allow said coupling element to be used to couple already existing prefabricated panels.

However, said coupling element 2 may be free of such protrusions, without thereby departing from the scope of the invention.

With reference to FIGS. 4A and 4B, the plate key is shown.

The plate key 3 is a key made on the model of a split wrench, having the thickness of a plate (lamina).

The plate key comprises a plurality of projections aligned along a first axis and disposed close to a first side of said plate key and a plurality of projections aligned along a second axis parallel to said first axis and arranged in the proximity of a second side of said plate key, opposite to said first side.

In particular, the plate key 3 has a first surface 31 and a second surface 32 opposite the said first surface 31, said plurality of projections comprise at least a first projection B1 disposed on said first surface 31 and at least a second projection B2 disposed on said second surface 32 and said plurality of projections comprise at least one further first projection B1' disposed on said first surface 31 and at least one second projection B2' arranged on said second surface 32.

In the embodiment illustrated, said plurality of projections comprises three projections, of which two first projections B1 and a second projection 62, wherein said second projection B2 is arranged between said first two projections B1 and said plurality of projections comprises three projections, of which two further first projections B1' and an additional second projection B2', wherein said further second projection B2' is arranged between said two further first projections B1'.

The projections facilitate the sliding of the plate between the prefabricated panels because the friction occurs on individual points (i.e. the projections) and not on a surface of the plate key and compensate for the possible expansion of the prefabricated panels as they allow the key to 2o flex in correspondence of them.

Said plate key 3 has a recess 3A so that when it is attached to the coupling element 3, two portions of said plate key 3 located near said recess are within a respective 23A recess of the coupling element 2, as it can be seen in FIG. 5.

The plate key 3 is configured to rotate said coupling element 2 so that said two prefabricated panels 1,1' pass from a first position or rest position (shown in FIG. 6A), wherein said two prefabricated panels are not coupled by the coupling element, to a second position or locking position (shown in FIG. 6B), wherein said two prefabricated panels are coupled together by the coupling element and locked in a fixed position between them, and vice versa.

In particular, in the rest position, each frusto-pyramidal element of the coupling element is inserted into a respective groove 1A, 1A' with said first length oriented along the respective groove so that each frusto-pyramidal element is not constrained to the respective groove along said reference axis A.

In the locking position, each frusto-pyramidal element of the coupling element is inserted into a respective groove 1A, 1A' with said second length substantially oriented along the respective groove so that each frusto-pyramidal element is bound to the respective groove along said reference axis A.

Referring to FIG. 6A, the case is shown where the two prefabricated panels 1,1' are in a rest position, i.e., the position in which said two prefabricated panels are not interlocked.

Although the coupling element is interposed between them and the end parts 21, 22 of said coupling element 2 are within a respective groove 1A, 1A', the coupling element 2 is positioned in such a way that said first two steps 211 do not interfere with respective reliefs 11A, 12A of the first dove-tailed groove 1A of the first prefabricated panel 1, and said two second steps 221 do not interfere with respective reliefs 11A', 12A' of the second dove-tailed groove 1A' of the second prefabricated panel 1'.

Consequently, the coupling element 2 is free to slide within the two prefabricated panels, in the space formed substantially by the two dove-tailed grooves 1A, 1A'.

A portion of the plate key 3 is external to the two prefabricated panels 1,1' in order to be gripped and rotated by 90° by an operator to bring said two panels to the working position.

With reference to FIG. 6B, the case is shown where the two prefabricated panels 1,1' are in the locking position, i.e. the position in which said two prefabricated panels are blocked.

The coupling element 2 is positioned so that said first two steps 211 engage with respective reliefs 11A, 12A of the first dove-tailed groove 1A of the first prefabricated panel 1, said two steps 221 interfering with respective reliefs 11A', 12A' of the second dove-tailed groove 1A' of the second prefabricated panel 1'.

With reference to FIGS. 6A and 6B, the configuration of the bases of the coupling element allows the coupling element itself on one hand to be inserted within the grooves 1A, 1A' of the two prefabricated panels without the bases interfering with the sloping sides of a respective groove, and, on the other hand, when rotated by the plate key, to block said prefabricated panels, with the bases that interfere with the oblique sides of a respective groove.

FIG. 7 shows two prefabricated panels 1,1' coupled to each other.

The coupling element 2 is not shown in FIG. 7 since it is located inside the two prefabricated panels 1,1'.

The plate key 3 is in the space between the two prefabricated panels.

As can be seen from FIG. 7, the first surface S1 of the first prefabricated panel 1 and the first surface S1' of the second prefabricated panel 1' lie on the same plane.

The second surface S2 of the first prefabricated panel 1 also lies on the same plane as the second surface S2' of the second prefabricated panel 1'.

In other words, when two prefabricated panels are coupled, at least two surfaces, each belonging to a respective prefabricated panel, are adjacent and arranged on the same plane.

Advantageously, by means of the system of the invention, it is ensured that two prefabricated panels are coupled in such a way as to be parallel, avoiding that a prefabricated panel is inclined to the other.

The present invention has been described by way of illustration, but not by way of limitation, according to a preferred embodiment thereof, but it is to be understood that variations and/or modifications may be made by those skilled in the art without departing from its scope of protection, such as defined by the attached claims.

The invention claimed is:

1. A system for coupling two prefabricated panels for building, said system comprising:
  a first prefabricated panel and a second prefabricated panel having respectively a first groove dove-tail cross-sectionally shaped and a second groove dove-tail cross-sectionally shaped, each groove being formed by a first oblique side having a first end and a second end, a second oblique side having a first end and a second end, and by a third side connecting the first end of said first oblique side to the first end of said second oblique side,
  at least one coupling element for coupling said first prefabricated panel with said second prefabricated panel, where said coupling element has, in a longitudinal section, substantially the shape of an hourglass formed by a first frusto-pyramidal element having a first height and a second frusto-pyramidal element having a second height, equal to said first height, said coupling element having a first axis or reference axis passing through said first height and said second height, said frusto-pyramidal elements being symmetrical with respect to a plane perpendicular to said reference axis, said first frusto-pyramidal element and said second frusto-pyramidal element having respectively a first base and a second base, each base being configured so as to have a first length in a longitudinal direction and a second length in a transverse direction, where said first length is greater than said second length,
  a plate key, integral with said coupling element and perpendicular or substantially perpendicular to said reference axis, configured to rotate said coupling element from a rest position, in which each frusto-pyramidal element is inserted in a respective groove with said first length substantially oriented along said respective groove so that each frusto-pyramidal element is not engaged to the respective groove along said reference axis, to a blocking position, where each frusto-pyramidal element is inserted in the respective groove with said second length oriented substantially along said respective groove so that each frusto-pyramidal element is engaged to the respective groove along said reference axis, and vice versa;
  characterized in that:
  the first oblique side and the second oblique side of said first groove have respectively a first relief and a second relief, each of which is respectively arranged at the second end of a respective oblique side of said first groove and protrudes so as to form a first step and a second step respectively with the respective oblique side, said first relief being facing said second relief,
  the first oblique side and the second oblique side of said second groove have respectively a third relief and a fourth relief, each of which is respectively arranged at the second end of a respective oblique side of said second groove and protrudes so as to form a third step and a fourth step respectively with the respective oblique side, said third relief facing said fourth relief, and
  in that
  said coupling element has along said reference axis a first end part, a second end part and a central part, disposed between said first end part and said second end part, where said first end part protrudes with respect to said central part in such a way as to form at least a first step and where said second end part protrudes from said central part in such a way as to form at least a second step, so that, when said two prefabricated panels are in said blocking position, the first relief and the second relief of said first groove of said first prefabricated panel are in contact with said at least one first step of said coupling element, and the third relief and the fourth relief of said second prefabricated panel are in contact with said at least one the second step of said coupling element.

2. The system according to the claim 1, characterized in that said coupling element has two first cavities, opposite each other, arranged in correspondence of at least said first end part, so that two first steps, opposite each other, are formed with respect to said central part, and in that said coupling element has two second cavities, opposite each other, arranged in correspondence of at least said second end part so that two seconds steps, opposite each other, are formed with respect to the central part.

3. The system according to claim 1, characterized in that said plate key has a first surface and a second surface, opposite said first surface, and in that said plate key comprises a plurality of projections, aligned along a first axis and arranged in proximity of a first side of said plate key and a further plurality of projections, aligned along a second axis, parallel to said first axis, and arranged in proximity of a second side, opposite said first side, where said plurality of projections comprises at least a first projection, positioned on said first surface, and at least a second projection, positioned on said second surface, and said further plurality of projections comprises at least one further first projection, positioned on said first surface, and at least one further second projection, positioned on said second surface.

4. The system according to claim 1, characterized in that said coupling element is provided with a first pair of first protrusions, arranged at opposite portions of said first end part, and a second pair of second protrusions, arranged at opposite portions of said second end part.

5. The system according to claim 4, characterized in that said coupling element has two recesses, opposite each other, for housing a portion of said plate key, arranged on the same plane, perpendicular to said reference axis, and in that said coupling element is provided with a third pair of third protrusions, arranged on the first frusto-pyramidal element at opposite portions of said central part so as to be at a first predetermined distance from a second axis, perpendicular to said reference axis and passing through said recesses, and a fourth pair of forth protrusions, arranged on the second frusto-pyramidal element at opposite portions of said central part so as to be at a second predetermined distance from said second axis, equal to said predetermined first distance.

\* \* \* \* \*